United States Patent [19]
Tani

[11] Patent Number: 5,379,069
[45] Date of Patent: Jan. 3, 1995

[54] SELECTIVELY OPERABLE PLURAL IMAGING DEVICES FOR USE WITH A VIDEO RECORDER

[75] Inventor: Nobuhiro Tani, Tokyo, Japan

[73] Assignee: Asahi Kogaku Kogyo Kabushiki Kaisha, Tokyo, Japan

[21] Appl. No.: 75,884

[22] Filed: Jun. 14, 1993

[30] Foreign Application Priority Data

Jun. 18, 1992 [JP] Japan ................................ 4-184460

[51] Int. Cl.6 ............................................ H04N 9/09
[52] U.S. Cl. ................................. 348/333; 348/262; 348/279; 360/35.1
[58] Field of Search ............... 358/10, 21 R, 41, 43, 358/48, 181, 50, 52, 332; H04N 9/09; 348/185, 184, 705, 708, 333, 341, 262, 279, 272, 266; 360/31, 35.1

[56] References Cited

U.S. PATENT DOCUMENTS

| | | | |
|---|---|---|---|
| 3,542,944 | 4/1968 | Peffar et al. | 358/41 |
| 3,699,241 | 10/1972 | Larsen | 358/43 |
| 4,691,253 | 9/1987 | Silver | 360/35.1 |
| 4,746,972 | 5/1988 | Takanashi et al. | 358/43 |
| 4,876,590 | 10/1989 | Parulski | 348/333 |
| 4,876,591 | 10/1989 | Muramatsu | 358/43 |
| 5,016,094 | 5/1991 | Kaneko | 358/41 |
| 5,162,903 | 11/1992 | Ogino et al. | 358/181 |
| 5,172,220 | 12/1992 | Beis | 358/43 |

Primary Examiner—Mark R. Powell
Assistant Examiner—Jeffrey S. Murrell
Attorney, Agent, or Firm—Sandler, Greenblum & Bernstein

[57] ABSTRACT

A moving picture monitoring device includes a first CCD on which an infrared-cut-filter is provided, and a second CCD on which an infrared-cut-filter and a complementary colors filter are provided. The complementary colors filter has magenta filter elements, green filter elements, yellow filter elements and cyan filter elements, which are disposed in a predetermined arrangement. In a monitor-through mode, only the second CCD is operated. A digital signal processing circuit generates differential color signals (R-YL, B-YL) and a luminance signal (YL). These signals (R-YL, B-YL, YL) are outputted to a display device, so that a color moving picture is indicated thereon.

27 Claims, 3 Drawing Sheets

Fig. 2A

| W | W | W | W |
|---|---|---|---|
| W | W | W | W |
| W | W | W | W |
| W | W | W | W |

| M | G | M | G | } 52a
| Y | C | Y | C | } 52b
| G | M | G | M | } 52a'
| Y | C | Y | C | } 52b'

| R | G | B | R |
|---|---|---|---|
| R | G | B | R |
| R | G | B | R |
| R | G | B | R |

| MODE | | S1 | S2 | S3 | | P1 | P2 | P3 | P4 | P5 |
|---|---|---|---|---|---|---|---|---|---|---|
| LOW DISSIPATION ELECTRIC CURRENT | | H | L | | | H | L | H | L | H |
| HIGH RESOLUTION | COLOR | L | H | | | L | L | L | L | L |
| | MONOCHROME | L | L | | | L | H | L | H | L |
| PHOTOGRAPHING | | | | L | | L | L | L | L | L |

SELECTIVELY OPERABLE PLURAL IMAGING DEVICES FOR USE WITH A VIDEO RECORDER

BACKGROUND OF THE INVENTION

1. Field of the Invention

The present invention relates to a video device in which two imaging devices are provided for obtaining a color image.

2. Description of the Related Art

A conventional dual-CCD-type video device is constructed in such a manner that a luminance signal and color signals are obtained by using two large coupled devices (CCD). In such a video device, when a moving picture is monitored through a display device (i.e., a monitor-through mode), the color moving picture is generated by operating two CCDs.

The CCD, however, generates a large amount of heat due to the large amount of electric current it draws, and thus, dark current is easily generated in the CCD. Therefore, when the video device is operated for a long time to monitor a moving picture, a problem occurs in which the image quality of the picture decreases due to the dark current. Further, in a video camera which is operated by a battery, the life of the battery would be shortened due to the large amount of electric current drawn by the CCD.

SUMMARY OF THE INVENTION

Therefore, an object of the present invention is to provide a moving picture monitoring device which uses only a small amount of electric current.

According to the present invention, there is provided a moving picture monitoring device comprising a first imaging device, a second imaging device and generating means. The first imaging device senses luminance of an object to output a signal corresponding to the luminance. The second imaging device senses colors of the object to output signals corresponding to the colors. The generating means generates an image signal of the moving picture in accordance with a signal or signals outputted by one of the first and second imaging devices.

Further, according to the present invention, there is provided a moving picture monitoring device comprising first sensing means, second sensing means, generating means and a switch. The first sensing means senses luminance of an object to output a signal corresponding to the luminance. The second sensing means senses colors of the object to output signals corresponding to the colors. The generating means generates an image signal of the moving picture in accordance with the signal or signals outputted by the first or second means. The switch connects the generating means selectively to one of the first and second sensing means.

Furthermore, according to the present invention, there is provided a video device having a plurality of imaging devices, comprising means for generating an image signal of a moving picture in accordance with a signal or signals outputted by one of the plurality of imaging devices.

BRIEF DESCRIPTION OF THE DRAWINGS

The present invention will be better understood from the description of the preferred embodiments of the invention set forth below, together with the accompanying drawings, in which:

FIGS. 2A and 2B are a diagram showing arrangements of filter elements of an infrared-cut-filter and a complementary colors filter with a checkerboard arrangement;

FIG. 3 is a diagram of a primary color filter with a striped arrangement of filter elements; and FIG. 4 is a diagram showing each of the terminal voltages of the circuit of the still video device shown in FIG. 1.

DESCRIPTION OF THE PREFERRED EMBODIMENTS

Figure 1:
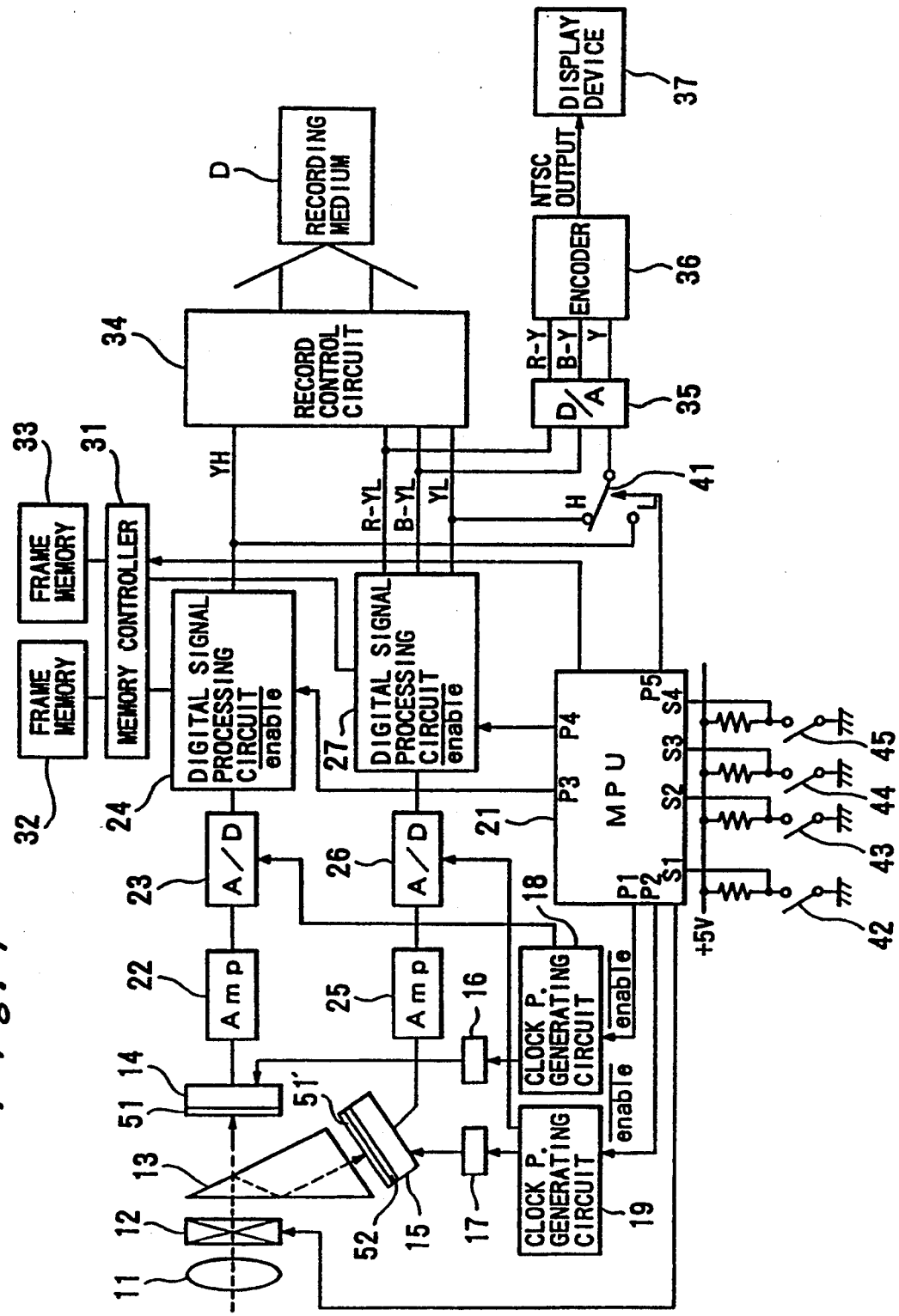
FIG. 1 is a block diagram showing a circuit of a still video device to which an embodiment of the present invention is applied.

The present invention will now be described with reference to embodiments shown in the drawings.

FIG. 1 is a block diagram showing a recording system of a still video device to which an embodiment of the present invention is applied.

A beam passes through a lens 11 and a shutter 12 which functions also as an aperture, and is divided into two beams to reach a first CCD 14 and a second CCD 15, respectively. These CCDs 14 and 15 are disposed at positions which are optically coupled with each other, so that identical images are formed on the CCDs 14 and 15. An infrared-cut-filter 51 is provided on the first CCD 14, and an infrared-cut-filter 51' and a complementary colors filter 52 arranged in a checkerboard arrangement are provided on the second CCD 15. Therefore, the first CCD 14 senses luminance of an object to output a luminance signal of the object, and the second CCD 15 senses colors of the object to output color signals of the object. Operation of the complementary colors filter 52 is described later.

The first and second CCDs 14 and 15 are driven by control pulse signals outputted from drivers 16 and 17 to output the luminance signal and the color signals, respectively. Clock pulse generating circuits 18 and 19 output clock pulse signals, and the drivers 16 and 17 adjust the amplitudes of the respective clock pulse signals to output the control pulse signals. The clock pulse generating circuits 18 and 19 are controlled by a control circuit (MPU) 21, to output the clock pulse signals having amplitudes of 5 V, for example, and with a constant period.

The output signal of the first CCD 14 is amplified by an amplifier 22, and is converted to a digital signal by an A-D converter 23 to be iputted into a first digital signal processing circuit 24. The output signal of the second CCD 15 is amplified by an amplifier 25, and is converted to a digital signal by an A-D converter 26 to be iputted into a second digital signal processing circuit 27. Note, the A-D converters 23 and 26 are driven by the clock pulse signals outputted from the clock pulse generating circuits 18 and 19, to carry out the A-D conversion at the same timing as the transferring operations of electric charges in the CCDs 14 and 15.

The first digital signal processing circuit 24 is operated under the control of the MPU 21. The first digital signal processing circuit 24 carries out a predetermined process, such as adding a synchronizing signal to a luminance signal outputted from the A-D converter 23, to output a luminance signal (YH) having a high resolution. When the shutter 12 of the still video device is operated, the luminance signal (YH) is stored in a frame memory 32 through a memory controller 31, and is also inputted into a record control circuit 34.

The second digital signal processing circuit 27 is also operated under the control of the MPU 21, similar to the first digital signal processing circuit 24. The second digital signal processing circuit 27 carries out a predetermined process, such as adding synchronizing signals to color signals outputted from the A-D converter 26, to output differential color signals (R-YL, B-YL) and a luminance signal (YL). When the shutter 12 of the still video device is operated, the differential color signals (R-YL, B-YL) are stored in a frame memory 33 through the memory controller 31, and are also inputted into the record control circuit 34. When a moving picture of the object to be photographed by the still video device is monitored, namely in a monitor-through mode, the differential color signals (R-YL, B-YL) and the luminance signal (YL) are supplied to a display device 37 through a D-A converter 35 and an encoder 36.

Note, the resolution of the luminance signal (YL) outputted from the second digital signal processing circuit 27 is lower than that of the luminance signal (YH) outputted from the first digital signal processing circuit 24. The luminance signal (YL), however, is used only for monitoring, and therefore, the resolution of the luminance signal (YL) does not matter for photographing with the still video device. Although the resolutions of the differential color signals (R-YL, B-YL) are also lower than that of the luminance signal (YH) of the first digital sisal processing circuit 24, this does not matter since the color resolution of the eyes of a human being is slower than that of luminance.

When the shutter 12 is operated, the record control circuit 34 records the luminance signal (YH) inputted from the first digital processing circuit 24 and the differential color signals (R-YL, B-YL) inputted from the second digital processing circuit 27 on a recording medium D such as a memory card or a magnetic disk. Note, although the luminance signal (YL) is also inputted into the record control circuit 34, this signal is not recorded on the recording medium D in this embodiment.

Note, the frame memories 32 and 33 are provided for storing an image signal corresponding to a still image recorded on recording medium D, so that the still image can be observed through the display device 37.

A luminance signal control switch 41 is provided for selectively connecting one of the luminance signals (YH, YL) outputted from the first and second digital signal processing circuits 24 and 27 to the D-A converter 35. Namely, in a first high resolution monitor-through mode, the switch 41 is switched to the side of the first digital signal processing circuit 24, so that the high resolution luminance signal (YH) is supplied to the D-A converter 35. Conversely, in a second low resolution monitor-through mode, the switch 41 is switched to the side of the second digital signal processing circuit 27, so that the luminance signal (YL) is supplied to the D-A converter 35.

When the switch 41 is switched to the side of the second digital signal processing circuit 27, the differential color signals (R-YL, B-YL) and the luminance signal (YL) outputted from the second digital signal processing circuit 27 are converted to analog signals by the D-A converter 35, and are inputted into the encoder 36. The encoder 36 generates an image signal of a moving picture of the object in accordance with the differential color signals (R-YL, B-YL) and the luminance signal (YL). This image signal is a composite video signal, which conforms with the NTSC (National Television System Committee) color system. The encoder 36 outputs the composite video signal to the display device 37, so that a moving color picture is indicated on the display device 37.

Thus, this moving picture is not made by using an output signal from the first CCD 14, but the luminance signal (YL) is obtained by an output signal from the second CCD 15. This will be described later in detail.

On the other hand, when the switch 41 is switched to the side of the first digital signal processing circuit 24, the high resolution luminance signal (YH) outputted from the first digital signal processing circuit 24 and the differential color signals (R-YL, B-YL) outputted from the second digital signal processing circuit 27 are inputted into the D-A converter 35. Namely, in this case, a high resolution color moving picture is indicated on the display device 37.

The MPU 21 is provided for controlling the whole still video device as described above, and outputs control signals in accordance with switching states of switches 42, 43, 44 and 45. The switches 42 and 43 are switched in accordance with an operating condition of the monitor-through mode as described later. The photometory switch 44 is turned ON by partly depressing the shutter button (not shown). The release switch 45 is turned ON by fully depressing the shutter button.

The filters 51, 51' and 52 provided on the first CCD 14 and the second CCD 15 are described below With reference to FIGS. 2A and 2B. Note, this drawing schematically shows arrangements of filter elements of the filters 51, 51' and 52. However, the actual number of filter elements corresponds to the number of pixels of the image.

The infrared-cut-filter 51 is provided on the first CCD 14, and the infrared-cut-filter 51' and the complementary colors filter 52 are provided on the second CCD 15. All of the filter elements forming the infrared-cut-filter 51 and 51' are transparent (W). The complementary colors filter 52 has magenta filter elements, green filter elements, yellow filter elements and cyan filter elements which are disposed in a predetermined arrangement. Namely, the complementary colors filter 52 has a first row 52a formed by alternately arranging Magenta (M) and Green (G) elements, and a second row 52b formed by alternately arranging Yellow (Y) and Cyan (C) elements. The first row 52a and the second row 52b are alternately arranged.

Note, regarding the first rows 52a and 52a' between which one second row 52b is disposed, Magenta (M) of the first row 52a is adjacent to Yellow (Y) of the second row 52b, and Magenta (M) of the other first row 52a' is adjacent to Cyan (C) of the second row 52b. In other words, Magenta (M) and Green (G) of the first row 52a are offset by one filter element in comparison with Magenta (M) and Green (G) of the other first row 52a'.

In the second low current monitor-through mode, as described above, the switch 41 is switched to the side of the second digital signal processing circuit 27, and at this time, operation of the first CCD 14 is suspended or stopped. Therefore, a moving picture of the object is obtained in accordance with the differential color signals (R-YL, B-YL) and the luminance signal (YL) outputted from the second digital signal processing circuit 27. Namely, the differential color signals (R-YL, B-YL) and the luminance signal (YL) are obtained through the complementary colors filter 52.

The resolution of an image in which a luminance signal is obtained through the complementary colors filter 52 is compared with the resolution of an image in which a luminance signal is obtained through only the infrared-cut-filter 51, and the resolution of an image in which a luminance signal is obtained through a striped primary colors filter 53 (FIG. 3), respectively. Note, in this comparison, only a row of pixels arranged in a horizontal direction is considered, to simplify the explanation.

When using the complementary colors filter 52, a luminance signal (YL) of one pixel is obtained from a first pixel 62 of Green (G) and a second pixel 61 of Magenta (M) positioned next to the left side of the first pixel 62. A luminance signal (YL) of the other pixel adjacent to the above described one pixel is obtained from the first pixel 62 of Green (G) and a third pixel 63 of Magenta (M) positioned next to the right side of the first pixel 62. Namely, in case of the complementary colors filter 52, the luminance signal (YL) of one pixel is obtained from two pixel signals. Conversely, when a luminance signal (YH) is obtained only through the infrared-cut-filter 51, the luminance signal (YH) of one pixel is obtained from one pixel signal, since each filter element is transparent (W).

Note, when using the complementary colors filter 52, the luminance signal (YL) of one pixel is obtained by using four pixels of Magenta (M), Green (G), Yellow (Y) and Cyan (C). However, since the luminance signal (YL) of one pixel can be obtained also by a pixel of Yellow (Y) and a pixel of Cyan (C), it is assumed in this explanation that the luminance signal (YL) of one pixel is obtained by one row arranged in a horizontal direction, i.e., Magenta (M) and Green (G). On the other hand, an explanation of how to generate the differential color signals (R-YL, B-YL) is omitted, since this is well known in the art.

Regarding the generation of the luminance signal, comparing a case in which the complementary colors filter 52 is used with a case in which the infrared-cut-filter 51 is used, although the number of sampled pixels is the same in both cases, the resolution of the image in the case of using the complementary colors filter 52 is lower than that using the infrared-cut-filter 51, since the luminance signal of one pixel is obtained from signals of two pixels when using the complementary colors filter 52. On the other hand, comparing the complementary colors filter 52 with the striped primary colors filter 53 (FIG. 3) which is formed by arranging the three primary colors of Red (R), Green (G) and Blue (B) in a striped pattern, since a luminance signal of one pixel is obtained from signals of three pixels in the case of the striped primary colors filter 53, the resolution when using the complementary colors filter 52 is higher than that when using the striped primary colors filter 53.

The resolution of an image signal which is obtained by using the infrared-cut-filter 51, the complementary colors filter 52 or the primary colors stripe filter 53 is described further below. Note, it is assumed that the image signal is generated according to the NTSC standard, and the number of pixels per one horizontal scanning line in the CCD is 768. Further, it is assumed that the horizontal driving frequency $f_{CK}$ of the CCD is approximately 14.3 MHz.

When the infared-cut-filter 51 is used, the maximum horizontal spatial frequency of the image which can be made to reappear is approximately 7.16 MHz, which is half of the horizontal driving frequency $f_{CK}$ of the CCD according to Nyquist's theorem. Since the resolution of 80 Tv per one horizontal scanning line is obtained when the bandwidth of the image signal is 1 MHz, the critical (maximum) horizontal resolution N of the infrared-cut-filter 51 is $$N \approx 80 \times 7.16 \approx 573 \ (Tv)$$

Suppose that an image which is uniformly green over one frame is photographed by using the complementary colors filter 52. In this case, a condition under which a luminance signal which is uniform over the entire one frame is described below.

A CCD output signal of a pixel corresponding to Magenta (M) is O, and the frequency of a CCD output signal of a pixel corresponding to Green (G) is 7.16 MHz (=14.3 MHz/2). The cut-off frequency $f_C$ of a low pass filter by which the frequency component (7.16 MHz) is removed to obtain a luminance signal which is uniform over one horizontal scanning line is approximately 6.0 MHz, for example. Therefore, in this case, the horizontal resolution N of the complementary colors filter 52 is $$N \approx 80 \times 6.0 \approx 480 \ (Tv)$$

Similarly, in the case in which an image which is uniformly green over one frame is photographed by using the primary colors stripe filter 53, a condition under which a luminance signal which is uniform over the entire one frame is described below.

In the case in which the striped primary colors stripe filter 53 is used, since Red (R), Green (G) and Blue (B) are alternately arranged across the filter 53, the frequency of an output signal in one horizontal scanning line is 4.77 MHz (=14.3 MHz/3). The cut-off frequency $f_C$ of a low pass filter by which the frequency component (4.77 MHz) is removed to obtain a luminance signal which is uniform over one horizontal scanning line is approximately 4.0 MHz, for example. Therefore, in this case, the horizontal resolution N of the primary colors stripe filter 53 is $$N \ 80 \times 4.0 \ 320 \ (Tv)$$

As understood from comparing the above two horizontal resolutions N, when the complementary colors filter 52 is used, the horizontal resolution N when using the complementary colors filter 52 is slightly lower than that of a case in which the infrared-cut-filter (monochrome filter) 51 is used, but is higher than that of a case in which the striped primary colors filter 53 is used.

Note, in this embodiment, a low pass filter for an output signal of the CCD 15 on which the complementary colors filter 52 is mounted is provided in the second digital signal processing circuit 27.

With reference to FIGS. 1 and 4, the operation of the still video device is decribed below.

Operation of the shutter 12 is controlled by the MPU 21, and in the monitor-through mode, the shutter 12 is kept open. When the photometory switch 44 is turned ON, luminance data of the object is obtained by a photometory mechanism, not shown. Then, the MPU 21 calculates the exposure time of the CCDs 14 and 15 based on the luminance data. The MPU 21 recognizes the timing for accumulating electric charges on the CCDs and reading out the electric charges from the CCDs, based on a clock signal outputted by the clock pulse generating circuits 18 and 19, and closes the shutter 12 when the exposure time has passed from a predetermined timing for reading out the electric charge, the predetermined timing being the first timing (or clock signal) measured after an ON condition of the release switch 45 is sensed by the MPU 21. After the shutter 12 is completely closed, the image signals are stored in the frame memories 32 and 33, and are recorded on the recording medium D in a predetermined format.

When the low-current monitor-through mode is carried out, switch 42 is turned OFF, and switch 43 is turned ON, so that voltage levels of the terminals S1 sand S2 of the MPU 21 become "H (high)" and "L (low)", respectively. As a result, voltage levels of the terminals P1, P2, P3, P4 and P5 of the MPU 21 become "H", "L", "H", "L" and "H", respectively. Accordingly, since the clock pulse generating circuit 18 is stopped, the first CCD 14 is stopped, and the first digital signal processing circuit 24 is stopped. On the other hand, the clock pulse generating circuit 19 is operated, so that the second CCD 15 is driven, and the second digital signal processing circuit 27 is driven through the MPU 21. The switch 41 is switched to the side of the second digital signal processing circuit 27.

Therefore, the differential color signals (R-YL, B-YL) and the luminance signal (YL) are generated in accordance with only signals obtained by the second CCD 15, and a color moving picture is indicated on the display device 37 in accordance with the signals (R-YL, B-YL, YL). Since this moving picture is obtained by driving only one CCD 15, the amount of electric current drawn by the circuit is low in comparison with a case in which both of the CCDs 14 and 15 are driven. Therefore, in this mode, the amount of heat generated in the circuit is less, and thus, a dark current essentially does not occur in the CCD 15, so that a higher quality image is obtained. Further, in a still video device which is driven by a battery, the life of the battery is longer since the amount of electric current drawn is low.

When the monitor-through mode with a high resolution color image is carried out, switch 42 is turned ON, and switch 43 is turned OFF, so that voltage levels of terminals S1 and S2 of the MPU 21 become "L" and "H", respectively. As a result, voltage levels of all the terminals P1 through P5 of the MPU 21 become "L". Accordingly, the clock pulse generating circuit 18 is operated, so that the first CCD 14 is driven, and the first digital signal processing circuit 24 is driven by the MPU 21. Similarly, the clock pulse generating circuit 19 is operated, so that the second CCD 15 is driven, and the second digital signal processing circuit 27 is also driven through the MPU 21. The switch 41 is switched to the side of the first digital signal processing circuit 24.

Namely, since the first and second CCDs 14 and 15 are driven, the high resolution luminance signal (YH) and the differential color signals (R-YL, B-YL) are generated, and thus, a color moving picture of a high resolution is indicated on the display device 37 in accordance with the signals (R-YL, B-YL, YH).

When the monitor-through mode with a high resolution monochromatic image is carried out, the switches 42 and 43 are turned ON, so that voltage levels of both of the terminals S1 and S2 of the MPU 21 become "L". As a result, voltage levels of the terminals P1, P2, P3, P4 and P5 of the MPU 21 become "L", "H", "L", "H" and "L". Accordingly, the clock pulse generating circuit 18 is operated, so that the first CCD 14 is driven, and the first digital signal processing circuit 24 is driven through the MPU 21. On the other hand, the clock pulse generating circuit 19 is stopped, so that the second CCD 15 is stopped, and the second digital signal processing circuit 27 is also stopped through the MPU 21. The switch 41 is switched to the side of the first digital signal processing circuit 24.

Therefore, since only the first CCD 14 is driven, the high resolution luminance signal (YH) is generated, and thus, a monochromatic moving picture of a high resolution is indicated on the display device 37 in accordance with the signal (YH). Thus, by driving only the first CCD 14 in the monitor-through mode, the dissipation electric current can be kept low.

In case in which a photographing operation is carried out in the monitor-through mode, when the shutter button is partly depressed, the photometry switch 44 is turned ON, so that voltage level of the terminal S3 of the MPU 21 becomes "L". As a result, voltage levels of all the terminals P1 through P5 of the MPU 21 become "L". Accordingly, the clock pulse generating circuit 18 is operated, so that the first CCD 14 is driven, and the first digital signal processing circuit 24 is also driven through the MPU 21. Similarly, the clock pulse generating circuit 19 is operated, so that the second CCD 15 is driven, and the second digital signal processing circuit 27 is also driven through the MPU 21. The switch 41 is switched to the side of the first digital signal processing circuit 24.

Therefore, in the photographing operation, the high resolution luminance signal (YH) and the differential color signals (R-YL, B-YL) are generated in accordance with the signals obtained by the two CCDs 14 and 15, and these signals (R-YL, B-YL, YH) are inputted into the record control circuit 34. By the record control circuit 34, the luminance signal (YH) and the differential color signals (R-YL, B-YL) are subjected to a predetermined process such as a frequency-modulation, and are recorded on the recording medium D, such as a memory card or a magnetic disk. At this time, a high resolution color moving picture is indicated on the display device 37. Note, when a memory card is used, the frequency-modulation by the record control circuit 34 is not needed.

Note, when the shutter button is fully depressed, so that the release switch 45 is turned ON, voltage levels of all the terminals P1 through P5 of the MPU 21 may be set to "L" so that the first and second CCDs 14 and 15 are driven.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 4-184460 (filed on Jun. 18, 1992) which is expressly incorporated herein by reference in its entirety.

I claim:

1. A still video camera, comprising:
a first imaging device for sensing a luminance of an object to be recorded to output a signal corresponding to said luminance;
a second imaging device for sensing at least one color of said object to output a signal corresponding to said at least one color;
means for selecting between a monitor-through mode in which a moving picture of said object is monitored and a photographing mode in which a still picture of said object is recorded to a recording medium;

first generating means for generating an image signal of said moving picture of said object in accordance with a signal outputted by one of said first imaging device and said second imaging device when said selecting means selects said monitor-through mode; and second generating means for generating an image signal of said still picture of said object in accordance with signals outputted by said first imaging device and said second imaging device when said selecting means selects said photographing mode.

2. The still video camera of claim 1, further comprising an operating member, said operating member, when actuated, comprising means for recording said still picture of said object to said recording medium, said first imaging device and said second imaging device being driven when said operating member is actuated.

3. The still video camera of claim 1, further comprising means for disabling one of said first imaging device and said second imaging device in said monitor-through mode.

4. The still video camera of claim 1, further comprising a color filter used with said second imaging device.

5. The still video camera of claim 4, wherein said color filter comprises a color complementary color filter having magenta filter elements, green filter elements, yellow filter elements and cyan filter elements disposed in a predetermined arrangement.

6. The still video camera of claim 5, wherein said color filter comprises a striped primary color filter.

7. The still video camera of claim 1, wherein said first imaging device outputs a first luminance signal having a high resolution, and said second imaging device outputs a differential color signal plus a second luminance signal having a resolution that is lower than said first luminance signal.

8. The still video camera of claim 7, wherein said first generating means generates said image signal in accordance with said first luminance signal and said differential color signal.

9. The still video camera of claim 1, wherein said recording medium comprises a memory card.

10. The still video camera of claim 1, wherein said recording medium comprises a magnetic disk.

11. A still video camera, comprising:
a first imaging device that outputs a luminance signal;
a second imaging device that outputs a color signal;
means for selecting between a monitor-through mode in which a moving picture of an object to be recorded is monitored and a photographing mode in which a still picture of said object is recorded to a recording medium; and
means for disabling one of said first imaging device and said second imaging device when said selecting means selects said monitor-through mode.

12. The still video camera of claim 11, wherein said disabling means disables said second imaging device when said selecting means selects said monitor-through mode.

13. The still video camera of claim 11, further comprising:
means for generating a high resolution monochromatic moving picture of said object from said luminance signal output by said first imaging device when said disabling means disables said second imaging device.

14. The still video camera of claim 11, further comprising a color filter used with said second imaging device.

15. The still video camera of claim 14, wherein said color filter comprises a color complementary color filter having magenta, green, yellow and cyan filter elements disposed in a predetermined arrangement.

16. The still video camera of claim 14, wherein said color filter comprises a striped primary color filter.

17. The still video camera of claim 11, wherein said recording medium comprises a memory card.

18. The still video camera of claim 11, wherein said recording medium comprises a magnetic disk.

19. A video recorder, comprising:
a first imaging device that produces a luminance signal corresponding to an object to be recorded;
a second imaging device that produces color signals corresponding to said object;
means for selecting between a monitor-through mode in which a moving picture of said object is monitored on a display and a photographing mode in which a still picture of said object is recorded to a recording medium;
means for generating an image signal in accordance with said luminance signal and said color signals produced by said first imaging device and said second imaging device, respectively, to record said still picture of said object to said recording medium when said selecting means selects said photographing mode; and
means for disabling one of said first imaging device and said second imaging device when said selecting means selects said monitor-through mode.

20. The video recorder of claim 19, wherein said disabling means disables said second imaging device when said selecting means selects said monitor-through mode.

21. The video recorder of claim 19, wherein said recording medium comprises a memory card.

22. The video recorder of claim 19, wherein said recording medium comprises a magnetic disk.

23. The video recorder of claim 19, wherein said video recorder comprises an electronic still camera.

24. The video recorder of claim 19, further comprising a color filter used with said second imaging device.

25. The video recorder of claim 24, wherein said color filter comprises a color complementary color filter having magenta, green, yellow, and cyan filter elements disposed in a predetermined arrangement.

26. The video recorder of claim 24, wherein said color filter comprises a striped primary color filter.

27. The video recorder of claim 19, wherein said first imaging device outputs a high resolution luminance signal, and said second imaging device outputs a differential color signal plus a luminance signal having a resolution that is lower than said high resolution luminance signal outputted by said first imaging device.

* * * * *